United States Patent
Wu et al.

(10) Patent No.: US 8,322,760 B2
(45) Date of Patent: Dec. 4, 2012

(54) BATTERY COVER MECHANISM

(75) Inventors: Xi-Qiu Wu, Shenzhen (CN); Guang-Xiang Zhang, Shenzhen (CN)

(73) Assignees: Shenzhen Futaihong Precision Industry Co., Ltd., Shenzhen, Guangdong Province (CN); FIH (Hong Kong) Limited, Kowloon (HK)

( * ) Notice: Subject to any disclaimer, the term of this patent is extended or adjusted under 35 U.S.C. 154(b) by 512 days.

(21) Appl. No.: 12/550,914

(22) Filed: Aug. 31, 2009

(65) Prior Publication Data

US 2010/0109345 A1 May 6, 2010

(30) Foreign Application Priority Data

Oct. 31, 2008 (CN) .......................... 2008 1 0305343

(51) Int. Cl.
*E05C 1/08* (2006.01)
*E05C 1/02* (2006.01)

(52) U.S. Cl. ................ 292/163; 292/137; 292/DIG. 37; 292/DIG. 63

(58) Field of Classification Search .................. 292/137, 292/163, 19, DIG. 37, DIG. 63
See application file for complete search history.

(56) References Cited

U.S. PATENT DOCUMENTS

| | | | | |
|---|---|---|---|---|
| 4,662,664 | A * | 5/1987 | Wendt et al. ..................... | 292/19 |
| 5,028,083 | A * | 7/1991 | Mischenko ................... | 292/175 |
| 5,722,705 | A * | 3/1998 | Deguchi .......................... | 292/87 |
| 7,188,871 | B2 * | 3/2007 | Nemoto et al. ............... | 292/170 |
| 7,441,813 | B2 * | 10/2008 | Qin et al. ....................... | 292/163 |
| 7,539,521 | B2 * | 5/2009 | Nam .......................... | 455/575.1 |
| 7,682,727 | B2 * | 3/2010 | Hsu ................................. | 429/97 |
| 7,727,666 | B2 * | 6/2010 | Liu ................................. | 429/97 |
| 2010/0244464 | A1 * | 9/2010 | Rajagopal et al. ............ | 292/163 |

* cited by examiner

*Primary Examiner* — Carlos Lugo
(74) *Attorney, Agent, or Firm* — Altis Law Group, Inc.

(57) ABSTRACT

A battery cover mechanism used in a portable electronic device includes a housing having an assembly groove and at least one holding aperture, a cover forming at least one lock and a rib at two ends thereof respectively, a latch member, and an elastic unit. The lock latches the holding aperture correspondingly, the latch member is slidably assembled in the assembly groove, the elastic unit is assembled in the assembly groove and resists the latch member, and the latch member latches the rib to latch the cover with the housing.

14 Claims, 5 Drawing Sheets

BATTERY COVER MECHANISM

BACKGROUND

1. Field of the Invention

The disclosure relates to battery cover mechanisms, particularly to a battery cover mechanism used in portable electronic devices.

2. Description of Related Art

Portable electronic devices such as mobile phones are widely used. When a battery is installed in the portable electronic device, the battery may be shielded and fixed in place by a battery cover mechanism.

A commonly used battery cover mechanism includes a cover and a housing. The cover includes a pin at one end and a protrusion at an opposite end. The housing defines a receiving hole and a holding aperture. The protrusion can be received in the holding aperture, and the cover pushed towards the housing until the pin is received in the receiving hole. As such, the cover securely engages the housing by protrusion seated in the holding aperture. However, removal of the pin from the receiving hole, when the cover is removed from the housing, requires considerable external force.

Therefore, there is room for improvement within the art.

BRIEF DESCRIPTION OF THE DRAWINGS

Many aspects of the present battery cover mechanism can be better understood with reference to the following drawings. The components in the various drawings are not necessarily drawn to scale, the emphasis instead being placed upon clearly illustrating the principles of the present battery cover mechanism. Moreover, in the drawings, like reference numerals designate corresponding parts throughout the diagrams.

DETAILED DESCRIPTION OF THE EMBODIMENT

Figure 1:
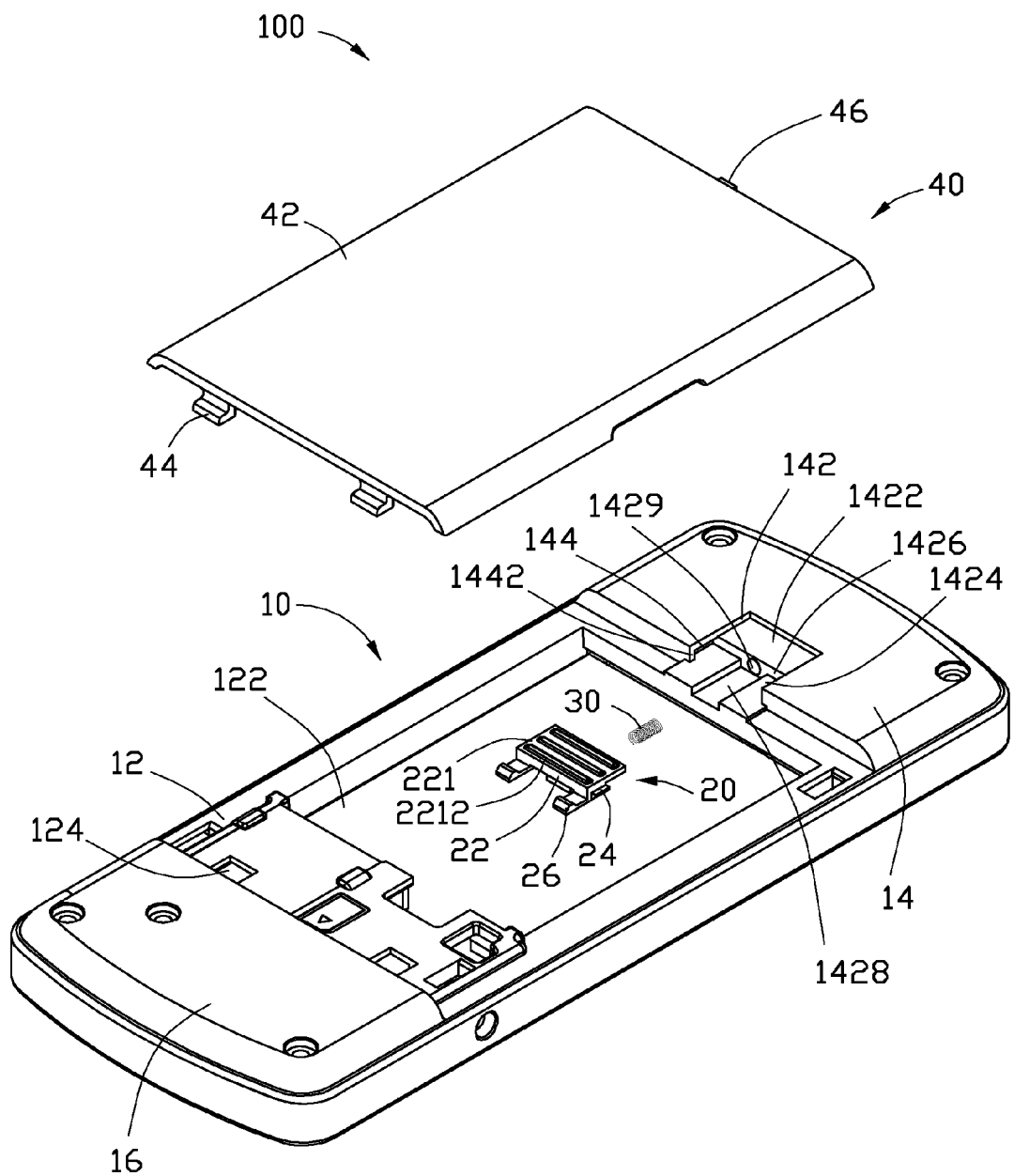
FIG. 1 is a disassembled view of the battery cover mechanism as disclosed.

Referring to FIG. 1, a battery cover mechanism 100 can be applied in mobile phones and other portable electronic devices such as personal digital assistants (PDAs), digital cameras, and others. The battery cover mechanism 100 includes a housing 10, a latch member 20, an elastic unit 30, and a cover 40.

The housing 10 includes a first end portion 14, a second end portion 16 and a recess portion 12 between the first end portion 14 and the second end portion 16. The recess portion 12 receives the cover 40 between the first end portion 14 and the second end portion 16. The first end portion 14 defines a stepped assembly groove 142 communicating with the recess portion 12. The assembly groove 142 includes a shallow first groove section 1422, a deep second groove section 1424, and a connecting wall 1426 separating the first groove section 1422 and the second groove section 1424. The second groove section 1424 includes a sliding slot 1428 at its bottom. The sliding slot 1428 extends to communicate with the recess portion 12. The second groove section 1424 further includes two opposite guide slots 144 at two sides. The two ends of the guide slots 144 are enclosed by the connecting wall 1426 and the sidewall of the recess portion 12. The guide slots 144 are used to receive the slidable latch member 20 and retain the latch member 20 therein. The connecting wall 1426 defines a receiving hole 1429 aligning with the sliding slot 1428 receiving the elastic unit 30.

The recess portion 12 defines a receiving cavity 122 and two holding apertures 124 at the bottom thereof. The receiving cavity 122 receives a battery (not shown). The holding apertures 124 are located adjacent to the second end portion 16 and facilitate latching of the cover 40 with the housing 10.

Figure 2:
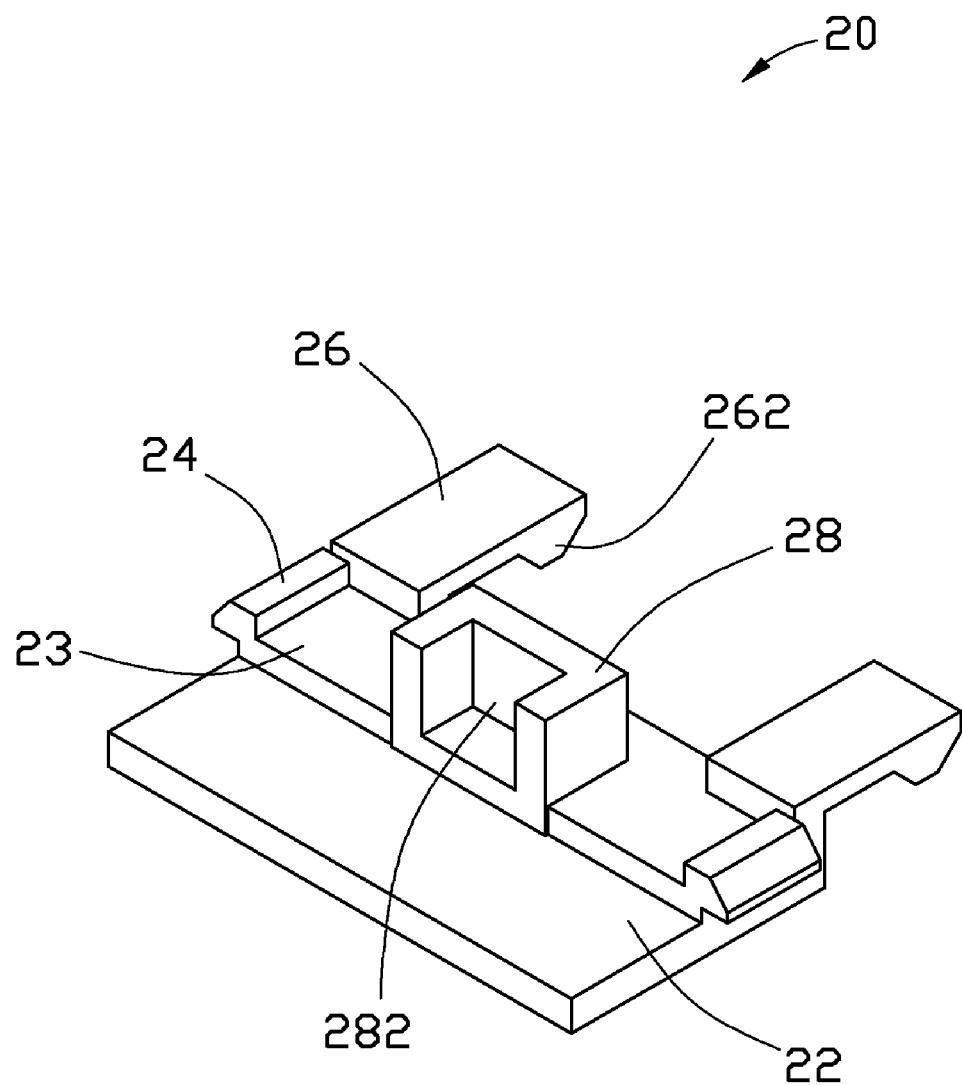
FIG. 2 is a schematic view of a latch member of the battery cover mechanism shown in FIG. 1.

Referring further to FIG. 2, the latch member 20 includes a main portion 22, a protruding portion 23, two guide portions 24, two extending portions 26 and a holding portion 28. The main portion 22 has a first surface 221 and an opposite second surface 223. The first surface 221 has a plurality of parallel strips 2212 for allowing manipulation of latch 20 by a user. The protruding portion 23 protrudes from the second surface 223. The two wedge-shaped guide portions 24 extend laterally from two opposite sides of the protruding portion 23, and the guide portion 24 slidably engages the guide slot 144 of the second groove section 1424. The two extending portions 26 extend outwardly and parallel from the end portion of the protruding portion 23. Each extending portion 26 has a distal protrusion 262 formed at the tail end thereof engaging the cover 40. The holding portion 28 protrudes from the protruding portion 23 and is received in the sliding slot 1428 and resists the elastic unit 30. The holding portion 28 defines a cutout 282 opposite to the extending portion 26. The cutout 282 receives part of the elastic unit 30.

Referring to FIG. 1, the elastic unit 30 is a coil spring. The two opposite ends of the elastic unit 30 can be received in the receiving hole 1429 of the connecting wall 1426 and the cutout 282 of the latch member 20 respectively.

The cover 40 includes a cover body 42 corresponding to the recess portion 12, two locks 44 extending outwardly from an end of the cover body 42, and a rib 46 extending outwardly from an opposite end of the cover body 42. The locks 44 latch the holding apertures 124 of the housing 10. The rib 46 engages the latch member 20.

Figure 3:
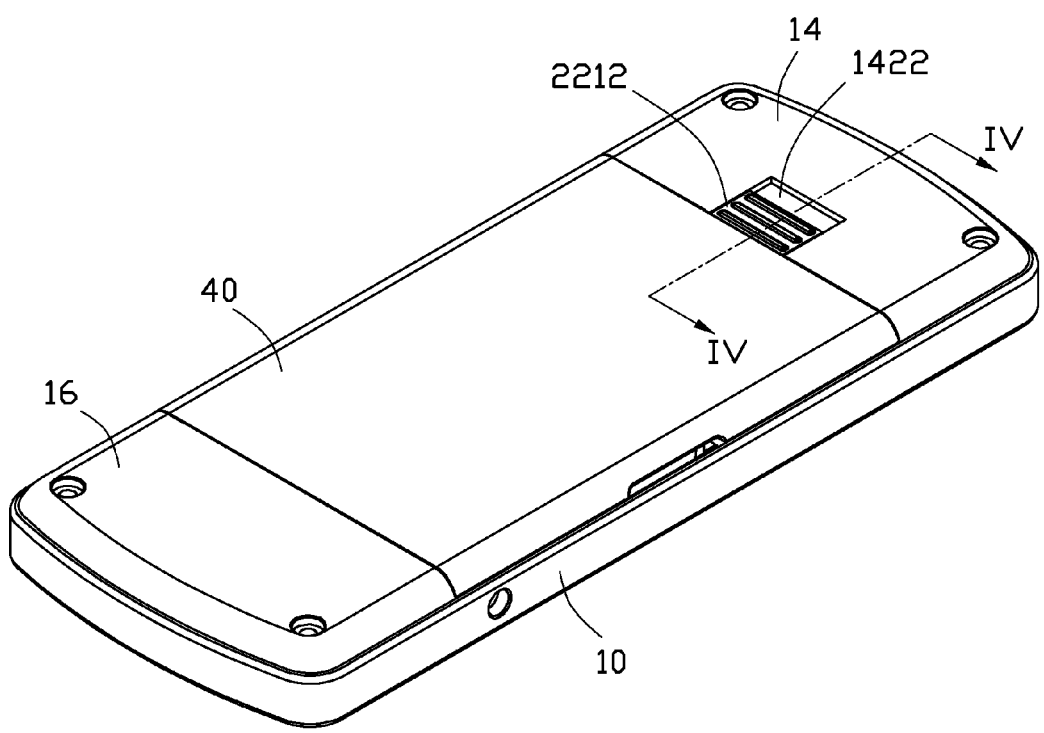
FIG. 3 is an assembled view of the battery cover mechanism shown in FIG. 1.
Figure 4:
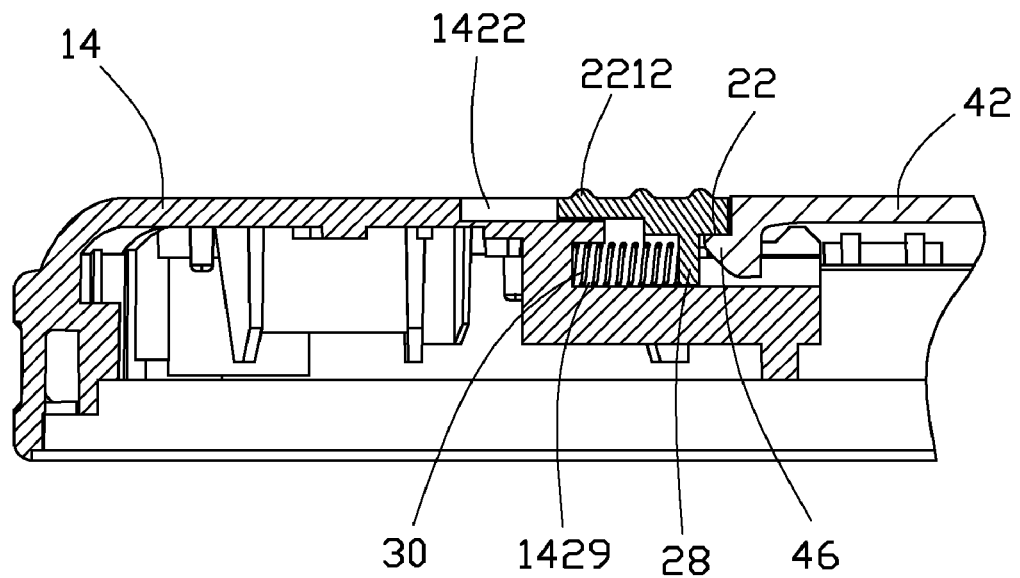
FIG. 4 is a sectional view along a line IV-IV in FIG. 3.
Figure 5:
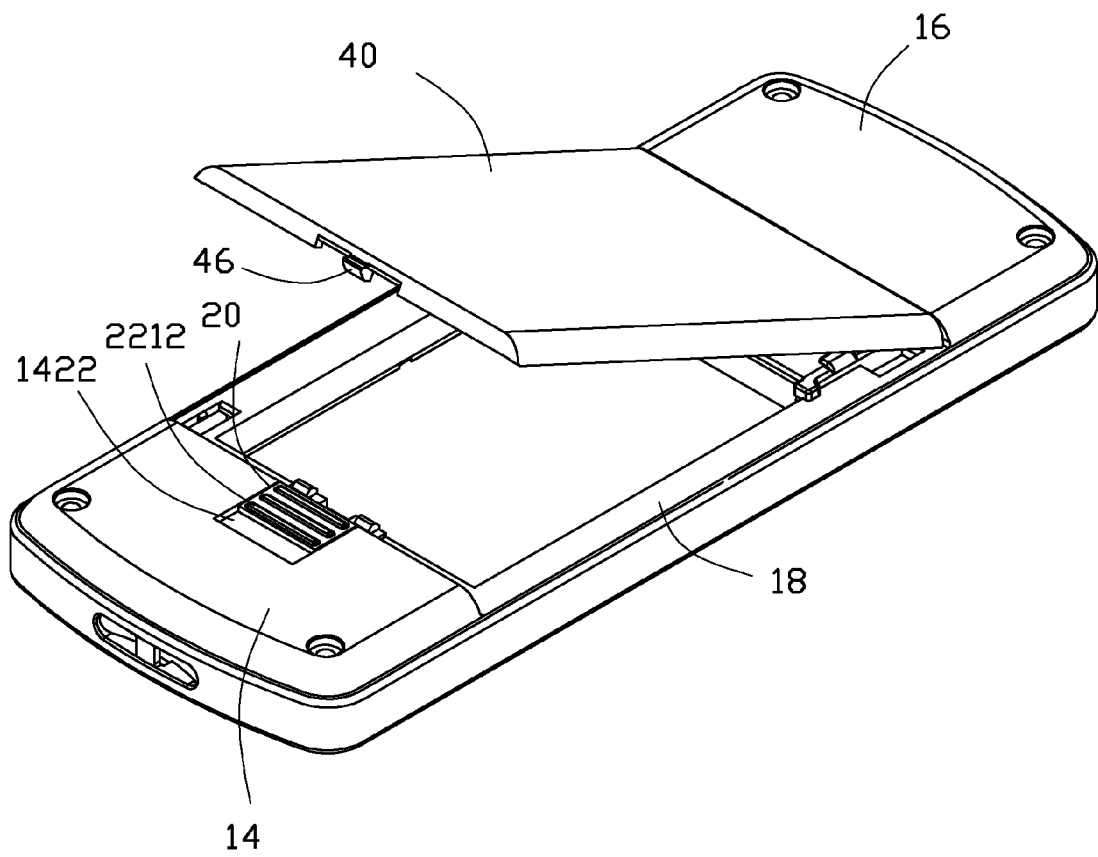
FIG. 5 is a schematic view of the battery cover mechanism shown in FIG. 1 in assembling a cover.

Referring to FIGS. 3-5, during assembly, the elastic unit 30 is received in the housing 10 with its end received in the receiving hole 1429. The latch member 20 is mounted into the assembly groove 142 of the housing 10 with its protruding portion 23 received in the second groove section 1424 and guide portions 24 received in the two guide slots 144. The holding portion 28 is accommodated in the sliding slot 1428 of second groove section 1424. Accordingly, the other end of the elastic unit 30 is received in the cutout 282 to resist the sidewall of cutout 282. The main portion 22 is partially and slidably accommodated in the first groove section 1422.

To latch the cover 40 to the housing 10, the locks 44 of the cover 40 are received in the holding apertures 124. The latch member 20 is pushed toward the end of first groove section 1422 until the holding portion 28 abuts the connecting wall 1426. The elastic unit 30 is compressed accordingly and accumulates potential elastic energy. The end of the cover 40 with rib 46 is pushed downwardly towards the recess portion 12. The rib 46 enters the sliding slot 1428. After being released, the latch member 20 moves towards the recess portion 12 by the force of the elastic unit 30. When the latch member 20 resists the cover 40, the extending portions 26 are further pushed by the cover 40. Accordingly, the protrusions 262 resist the cover 40. The rib 46 is latched into the sliding slot 1428. The cover 40 has been securely assembled to the housing 10. Likewise, the cover 40 can be removed from the housing 10 by pushing the latch member 20 in the opposite direction described above.

It is to be understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A battery cover mechanism for a portable electronic device, comprising:
   a housing comprising an assembly groove, at least one holding aperture defined therein, a first end portion, a second end portion, and a recess portion between the first end portion and the second end portion;
   a cover forming a rib and at least one lock at two ends respectively,
   a latch member comprising two guide portions respectively extending laterally at two opposite sides of the latch member, and two extending portions extending from an end of the latch member positioned between the two guide portions; and
   an elastic unit;
   wherein two sidewalls of the assembly groove comprise two opposite guide slots defined therein, the two guide portions slidably engage the guide slots,
   wherein the elastic unit is assembled in the assembly groove and resists the latch member, the latch member latches the rib of the cover, the two extending portions resist the cover, and the lock of the cover latches the holding apertures of the housing, whereby the cover latches the housing and can be removed from the housing by pushing the latch member; and
   wherein the assembly groove is defined in the first end portion and communicates with the recess portion, and the holding apertures are defined in the recess portion and adjacent to the second end portion, the assembly groove comprises a shallow first groove section, a deep second groove section communicating with the recess portion, and a connecting wall separating the first groove section and the second groove section;
   wherein the latch member further comprises a main portion and a protruding portion formed integrally with the main portion, the protruding portion forming the two guide portions extending laterally at the two sides to engage the two guide slots;
   wherein the main portion is a substantially rectangular planar board and includes a first surface and a second surface, and the first and second surfaces are opposite to each other and substantially parallel to each other; a plurality of strips are formed on the first surface, and the protruding portion is formed on the second surface; and
   wherein a part of the second surface protrudes to form the protruding portion, and the protruding portion is a substantially rectangular planar board and is substantially parallel to the main portion; the two guide portions are respectively formed on two opposite and substantially parallel side edges of the protruding portion, and both the two extending portions protrude from a third side edge of the protruding portion that is substantially perpendicular to the two side edges of the protruding portion where the two guide portions are respectively formed on.

2. The battery cover mechanism as claimed in claim 1, wherein the recess portion comprises a receiving cavity defined at the bottom, receiving a battery.

3. The battery cover mechanism as claimed in claim 1, wherein the second groove section defines a sliding slot at the bottom, and the connecting wall defines a receiving hole aligned with the sliding slot to receive an end of the elastic unit.

4. The battery cover mechanism as claimed in claim 3, wherein the guide slots are defined at the two sidewalls of the second groove section, and the two ends of the guide slots are enclosed by the connecting wall and the sidewall of the recess portion respectively.

5. The battery cover mechanism as claimed in claim 3, wherein the protruding portion forms the two extending portions at an end thereof extending outwardly parallel, each forming a protrusion at the tail end thereof.

6. The battery cover mechanism as claimed in claim 5, wherein the protruding portion comprises a holding portion protruding therefrom, receivable in the sliding slot.

7. The battery cover mechanism as claimed in claim 6, wherein the holding portion defines a cutout to receive an end of the elastic unit.

8. The battery cover mechanism as claimed in claim 1, wherein the elastic unit is a coil spring.

9. The battery cover mechanism as claimed in claim 1, wherein the cover comprises a cover body corresponding to the recess portion, wherein the locks extend outwardly from an end of the cover body, and the rib extends outwardly from an opposite end of the cover body.

10. A battery cover mechanism for a portable electronic device, comprising:
    a housing comprising an assembly groove and at least one holding aperture defined therein;
    a cover forming a rib and at least one lock at two ends thereof respectively;
    a latch member comprising two guide portions respectively extending from two opposite sides of the latch member, and two extending portions extending from a third side of the latch member that is positioned between the two guide portions and substantially perpendicular to the two side edges of the latch member where the two guide portions respectively extend from; and
    an elastic unit;
    wherein two sidewalls of the assembly groove comprise two opposite guide slots defined therein, the two guide portions slidably engage with the guide slots; and
    wherein the elastic unit is assembled in the assembly groove and resists the latch member, the latch member latches the rib, the two extending portions resist the cover, and the lock of the cover latches the holding apertures of the housing, whereby the cover latches the housing; and when the latch member is pushed to move away from the rib, the cover is released from the housing;
    wherein the latch member further includes a main portion and a protruding portion, the main portion is a substantially rectangular planar board and includes a first surface and a second surface, and the first and second surfaces are opposite to each other and substantially parallel to each other, a plurality of strips are formed on the first surface, and the protruding portion is formed on the second surface; and
    wherein a part of the second surface protrudes to form the protruding portion, and the protruding portion is a substantially rectangular planar board and is substantially parallel to the main portion; the two guide portions are respectively formed on two opposite and substantially parallel side edges of the protruding portion, and both the two extending portions protrude from a third side edge of the protruding portion that is substantially perpendicular to the two side edges of the protruding portion where the two guide portions are respectively formed on.

11. The battery cover mechanism as claimed in claim 10, wherein the housing comprises a first end portion, a second end portion, and a recess portion between the first and second end portions, the assembly groove is defined in the first end portion and communicates with the recess portion, and the holding apertures are defined in the recess portion and adjacent to the second end portion.

12. The battery cover mechanism as claimed in claim 11, wherein the assembly groove comprises a shallow first groove section, a deep second groove section communicating with the recess portion, and a connecting wall separating the first groove section and the second groove section.

13. The battery cover mechanism as claimed in claim 10, wherein each of the two extending portions forming a protrusion at the tail end thereof for engaging the cover, and, the main portion, the protruding portion, and the protrusions of both the two extending portions are all located at a same side of both the two extending portions.

14. The battery cover mechanism as claimed in claim 10, wherein the latch member further includes a holding portion, the holding portion perpendicularly protrudes from the protruding portion and is positioned between the two guide portions, and the holding portion defines a cutout to receive an end of the elastic unit.

\* \* \* \* \*